Nov. 4, 1952   E. K. DOMBECK   2,616,658
BRAKE SELECTOR VALVE
Filed Dec. 21, 1945
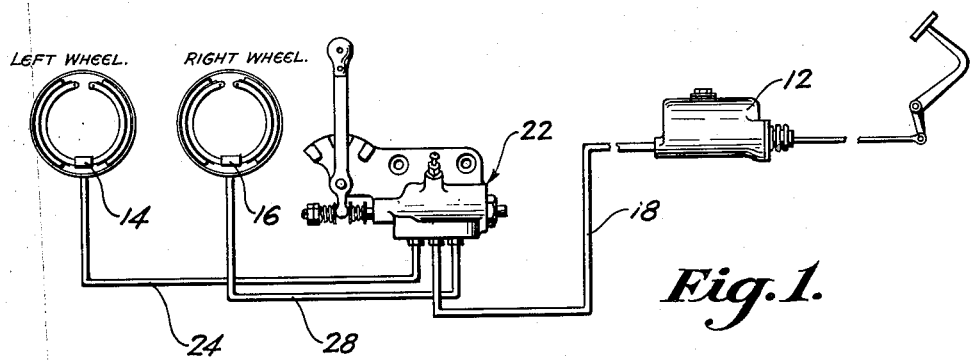
Fig.1.
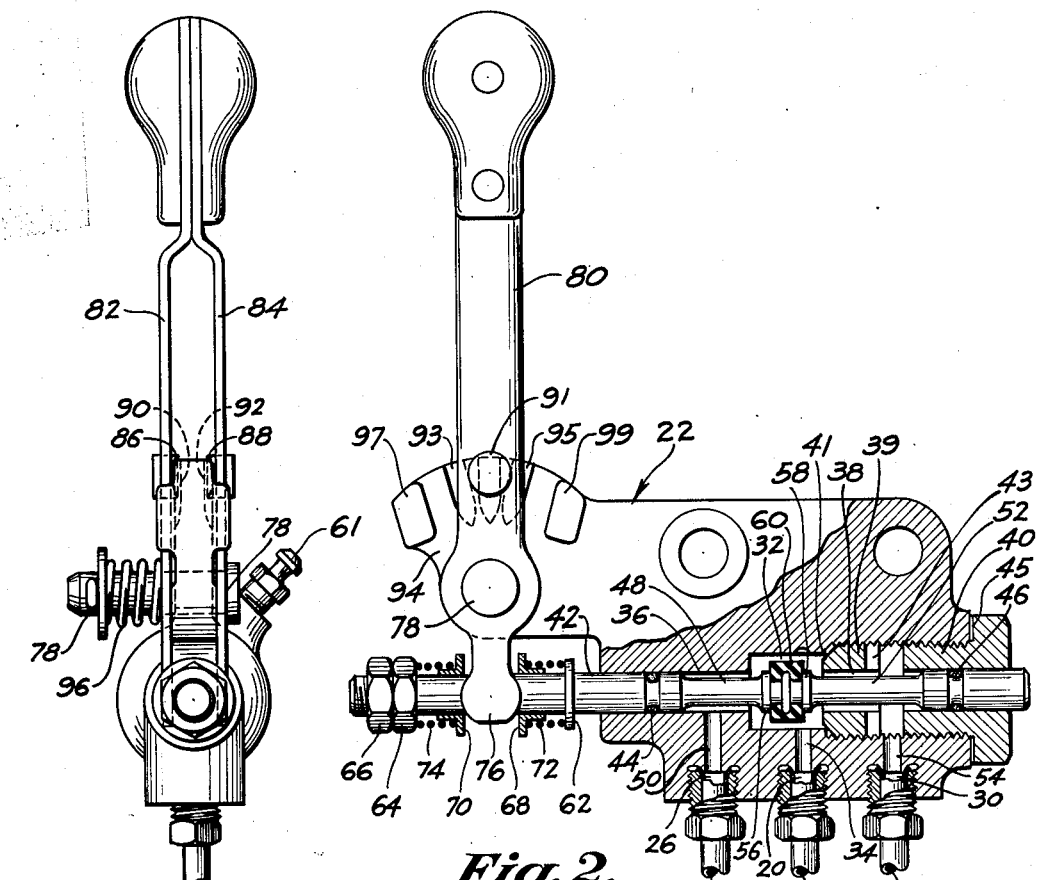
Fig.2.
Fig.3.
INVENTOR.
E. K. DOMBECK.
BY
T. J. Plante
ATTORNEY.

Patented Nov. 4, 1952

2,616,658

UNITED STATES PATENT OFFICE 2,616,658

BRAKE SELECTOR VALVE

Edward K. Dombeck, South Bend, Ind., assignor to Bendix Aviation Corporation, South Bend, Ind., a corporation of Delaware Application December 21, 1945, Serial No. 636,343

3 Claims. (Cl. 251—118)

This invention relates to a selector valve in a hydraulic braking system, which can be used to cause the braking effort to assist in steering the vehicle. By selectively shutting off the brake operating motor on one side or the other of the vehicle, the selector valve can prevent the outer wheel from being braked while the vehicle is turning, and thereby permit brake pressure to assist in steering. Also, a selector valve of this type makes it possible to hold one wheel while the other wheel is turning, thereby facilitating the movement of the vehicle if one of the wheels is unable to obtain traction. In this case the brakes should be applied only on the wheel which is unable to obtain traction, thereby permitting the other wheel to pull the vehicle out.

The object of the present invention is to provide a selector valve for a hydraulic braking system which is particularly simple in construction and yet efficient in operation.

Particular features of the present invention will become apparent during the course of the following description, reference being had therein to the accompanying drawings, in which:

Figure 1 is a diagrammatic view of a hydraulic braking system and the brake selector valve associated therewith;

Figure 2 is a vertical section showing an enlarged view of the selector valve; and Figure 3 is an end view of said selector valve.

Referring to the drawings, a conventional master cylinder 12 is shown adapted to apply actuating pressure to motors or wheel cylinders 14 and 16, which are associated with the brakes at opposite sides of the vehicle. As a general rule, an arrangement of the present type will be applied to vehicles of the type of farm tractors which, although provided with steering apparatus on the front wheels often find it necessary to turn more sharply than possible with the unassisted steering arrangement.

Master cylinder 12 is connected by means of a conduit 18 to a port 20 in the body of the selector valve, said selector valve being indicated generally at 22. A conduit 24 connects port 26 of the selector valve to the left wheel brake-actuating motor 14, and a conduit 28 connects port 30 of the selector valve to the right wheel brake-actuating motor 16.

A chamber 32 is formed within the valve body and is connected by means of passage 34 with master cylinder port 20. Leading outwardly from chamber 32 are concentric bores 36 and 38 which are of smaller diameter than chamber 32, bore 36 extending through to the one end of the valve, and bore 38 being provided in a two-part threaded plug which is screwed into the opposite end of the valve body.

The utilization of a two-part closure member or plug is resorted to because of the necessity to seal fluid at two places, i. e., between chamber 32 and port 30, and between the interior of the valve and the right end of the valve body. The inner part 39 of the two-piece plug has a conical inner end which seats against shoulder 41 to prevent unwanted flow between chamber 32 and port 30. A cross slot 43 is provided in the outer end of member 39 to enable said member to be turned down to sealing position, and preferably the threads of member 39 are in relatively loose engagement with the wall threads in order to avoid misalignment between the conical inner end and shoulder 41. The outer piece 40 of the plug is formed separately from the inner piece 39 in order to avoid the cumulative effect of manufacturing tolerances on the seal at shoulder 41. A gasket 45 constitutes a seal between plug member 40 and the valve body.

Extending through the bores 36 and 38 and chamber 32 is a rod 42, which is reciprocable in the valve body for the purpose of controlling the connection between master cylinder port 20 on the one hand, and wheel cylinder ports 26 and 30 on the other hand. The rod 42 carries seals 44 and 46 near opposite ends thereof to prevent escape of fluid from the selector valve.

In the position shown, the rod 42 is so located as to permit free communication between the master cylinder and both of the wheel cylinders, thereby allowing both brakes to be fully applied in the normal manner. A reduced diameter section 48 of rod 42 permits communication between chamber 32 and a passage 50 which leads to port 26. Also, a reduced diameter section 52 of rod 42 permits communication between chamber 32 and a passage 54 leading to port 30. The inner end of reduced section 48 terminates in a shoulder 56 which is of substantially the same diameter as bore 36, in order that shoulder 56 will close the end of bore 36 if rod 42 is moved sufficiently far toward the left. A shoulder 58 is provided at the inner end of reduced section 52 arranged to close bore 38 if the rod 42 is moved sufficiently far toward the right. In order to fully seal off whichever bore is to be closed, a yieldable resilient sealing member 60 is carried by rod 42 between shoulders 56 and 58, and is arranged to seat against either end of chamber 32 to seal the substantially closed bore, the member 60 being made of rubber or like material.

A bleed screw 61 provides the closure for the usual bleed opening through which the fluid inside the valve flows during replacement of fluid and elimination of air in the system.

The left end of rod 42 extends an appreciable distance beyond the end of the valve body. A fixed collar member 62 is carried by rod 42 near the valve body, and a second fixed collar member, constituted by a nut 64 screwed on the threaded outer end of rod 42 and held in position by lock nut 66, is carried by the rod at the outer end thereof. Located between fixed collar members 62 and 64 are floating collars 68 and 70, which are urged away from the respective fixed collar member by means of compression springs 72 and 74. The floating collars 68 and 70 are in contact with the lower extension 76 of a lever which is pivoted at 78 on the valve body, and which has a handle portion 80 extending upwardly. The body of the lever is composed of spaced side portions 82 and 84, as shown in Figure 3. In order that the lever may be maintained in one of the three manually selected positions, i. e., left brake only, right brake only, or both brakes, detent mechanism is provided to yieldably retain the lever in position. This detent mechanism may comprise pawls 86 and 88 formed in the respective side members 82 and 84 of the lever, and arranged to slip into depressions 90 and 92 provided in opposite sides of the projecting portion 94 of the valve body. There are three spaced detents, for the reason discussed above. The aligned depressions 90 and 92 together constitute the center detent, which is given the reference numeral 91 in Figure 2. Two other detents 93 and 95 are provided at the opposite ends of the lever travel, and stops 97 and 99 are utilized to limit the endwise movement of the lever and prevent it from overrunning the end detents. In order to provide a detent engaging force which will effectively retain the lever in the selected position, while permitting a relatively slight effort to move the lever from one position to another, the resilient engagement of the pawl members with the depressions may be provided both by the inherent resiliency of the side members 82 and 84 of the lever and also by a spring 96 carried by pivot pin 78.

Operation of the improved selector valve is as follows. As long as full operation of both brakes is desired, the control lever is allowed to remain in the center position, as shown. However, if it is desired that only the left brake be applied when pressure is developed in master cylinder 12, the operator rotates the control lever in a counter-clockwise direction, bringing shoulder 58 into the end of bore 38, and bringing sealing member 60 into contact with the right end of chamber 32. This effectively cuts off communication between mastery cylinder 12 and the brake on the right side of the vehicle and prevents that brake from being applied even though pressure is developed in master cylinder 12. The right wheel will therefore continue to rotate while the left wheel is held, the result being a sharp left turn. The transmission of force between the control lever and rod 42 is accomplished through collar 68 and spring 72. This means that a slight overrun of the control lever is utilized to insure that the end of bore 38 will be effectively cut off from chamber 32. As the lever rotates it urges floating collar 68 toward the right, and movement of collar 68 acts through spring 72 against fixed collar 62 to drive rod 42 toward the right. The member 60 will seat against the right side of chamber 32 before the lever has reached the end of its travel and subsequent movement of the lever will compress spring 72 and increase the seating force on member 60.

On the other hand, if it is desired that only the right brake be applied, the operator moves the control lever in a clockwise direction until it reaches the proper detent. This movement of the lever exerts a force through floating collar 70 and spring 74 to urge fixed collar 64 and rod 42 toward the left. This movement of the plunger brings shoulder 56 into bore 36 and pulls sealing member 60 against the left side of chamber 32, thereby cutting off the left brake and preventing it from being applied even though hydraulic pressure is developed in the master cylinder. Therefore, when the operator applies the brakes the right wheel will be held while the left wheel continues to turn, resulting in a sharp right turn.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. A manually operable selector valve comprising a casing having a chamber therein and concentric bores extending from opposite sides of said chamber, said valve having three ports, one of which is connected to one of said bores, another of which is connected to the other of said bores, and the third of which is connected to the chamber, a rod reciprocable in the casing and guided in said concentric bores, said rod having two spaced reduced diameter portions opposite the first and second ports respectively, said reduced diameter portions terminating in shoulders normally located in the chamber and of substantially the same diameter as the respective concentric bores in order to close the selected bore when the rod is moved to cut off the connection between the third port and one of the other ports, a resilient yieldable sealing member carried by the rod between said shoulders and adapted to seat alternatively at either side of the chamber to complete the sealing off of the selected bore, said rod having one end protruding from the valve casing, two spaced fixed collar members on the protruding end of the rod, two floating collar members carried by the rod between said fixed collar members, two springs each acting between one of the floating collars and the adjacent fixed collar, a manually operable lever pivoted on the valve casing and having one end extending between and contacting the two floating collars, the other end of the lever constituting a handle, and a three position detent means formed by cooperating members carried by the lever handle and by the valve casing.

2. A manually operable selector valve comprising a casing having a chamber therein and concentric bores extending from opposite sides of said chamber, said valve having three ports, one of which is connected to one of said bores, another of which is connected to the other of said bores, and the third of which is connected to the chamber, a rod reciprocable in the casing and guided in said concentric bores, said rod having two spaced reduced diameter portions opposite the first and second ports respectively, said reduced diameter portions terminating in shoulders normally located in the chamber and of substantially the same diameter as the respective concentric bores in order to close the selected bore when the plunger is moved to cut off the connection between the third port and one of the other ports, a resilient yieldable sealing member carried by the rod between said shoulders and adapted to seat alternatively at either side of the chamber to complete the sealing off of the selected bore, said rod having one end protruding from the valve casing, two spaced fixed collar members on the protruding end of the rod, two floating collar members carried by the rod between said fixed collar members, two springs each acting between one of the floating collars and the adjacent fixed collar; and a manually operable lever pivoted on the valve casing and having one end extending between and contacting the two floating collars, the other end of the lever constituting a handle.

3. A manually operable selector valve comprising a casing having a chamber therein and concentric bores extending from opposite sides of said chamber, said valve having three ports, one of which is connected to one of said bores, another of which is connected to the other of said bores, and the third of which is connected to the chamber, a rod reciprocable in the casing and guided in said concentric bores, said rod having two spaced reduced diameter portions opposite the first and second ports respectively and adapted to permit communication between said first and second ports and the chamber, a sealing member carried by the rod and located in the chamber, said sealing member being adapted to seat at either side of the chamber to seal off one of the bores, said rod having one end protruding from the valve casing, two spaced fixed collar members on the protruding end of the rod, two floating collar members carried by the rod between said fixed collar members, two springs each acting between one of the floating collars and the adjacent fixed collar, and a manually operable lever pivoted on the valve casing and having one end extending between and contacting the two floating collars, the other end of the lever constituting a handle.

EDWARD K. DOMBECK.

REFERENCES CITED

The following references are of record in the file of this patent:

UNITED STATES PATENTS

| Number | Name | Date |
|---|---|---|
| 932,467 | Harris | Aug. 31, 1909 |
| 1,219,373 | Byers | Mar. 13, 1917 |
| 1,493,301 | Walker | May 6, 1924 |
| 1,546,672 | Peacock | July 21, 1925 |
| 1,623,557 | Rybeck | Apr. 5, 1927 |
| 1,798,973 | Cordier | Mar. 31, 1931 |
| 1,868,768 | Schneider | July 26, 1932 |
| 1,921,092 | Newton | Aug. 8, 1933 |
| 2,052,246 | Ray | Aug. 25, 1936 |
| 2,136,751 | Nampa | Nov. 15, 1938 |
| 2,260,381 | Kennon | Oct. 28, 1941 |
| 2,331,214 | Milster | Oct. 5, 1943 |

FOREIGN PATENTS

| Number | Country | Date |
|---|---|---|
| 433 | Great Britain | of 1870 |
| 5,723 | Great Britain | of 1903 |